United States Patent [19]

Banks et al.

[11] Patent Number: 5,083,508

[45] Date of Patent: Jan. 28, 1992

[54] EGG CRACKING DEVICE

[76] Inventors: John H. G. Banks, 87 Kiepersol Crescent, Lourie Park, Bloemfontein, Orange Free State; André Freitag, No. 22 Audrey Blignaut Street, Langenhoven Park, Bloemfontein, Orange Free State, both of South Africa

[21] Appl. No.: 623,076

[22] Filed: Dec. 6, 1990

[30] Foreign Application Priority Data

Dec. 12, 1989 [ZA] South Africa .................. 89/9457

[51] Int. Cl.⁵ ............................................. A47J 43/14
[52] U.S. Cl. ................................... 99/577; 99/568; 99/582; 30/120.1
[58] Field of Search ............... 99/568, 577, 496–500, 99/581, 582, 578; 30/120.1–120.5

[56] References Cited

U.S. PATENT DOCUMENTS

| 824,748 | 7/1906 | Schneider | 99/582 |
| 886,266 | 4/1908 | Stevens | 99/577 |
| 2,481,579 | 9/1949 | Dolezal | 30/120.1 |
| 2,589,408 | 3/1952 | Le Boeuf | 99/582 |
| 2,612,921 | 10/1952 | Tomola | 30/120.1 |
| 2,706,507 | 4/1955 | Bartell | 99/568 |
| 2,789,602 | 4/1957 | Zagala | 99/499 |
| 4,137,837 | 2/1979 | Warren | 99/499 |
| 4,137,838 | 2/1979 | Warren | 99/500 |
| 4,542,584 | 9/1985 | Talbot | 99/496 |

FOREIGN PATENT DOCUMENTS

| 8800069 | 6/1989 | PCT Int'l Appl. . |
| 1218694 | 1/1971 | United Kingdom . |
| 1294267 | 10/1972 | United Kingdom . |
| 2067391 | 7/1981 | United Kingdom . |

*Primary Examiner*—Timothy F. Simone
*Attorney, Agent, or Firm*—Jones, Tullar & Cooper

[57] ABSTRACT

An egg cracking device which includes two formations which are adapted to move towards a central portion of an egg thereby to pierce the shell of the egg and then to move apart to crack the egg shell into the halves.

3 Claims, 2 Drawing Sheets

5,083,508

EGG CRACKING DEVICE

BACKGROUND OF THE INVENTION

This invention relates to an egg cracking device.

SUMMARY OF THE INVENTION

The invention provides a device for cracking an egg which includes a cradle which supports the egg, a pair of shell piercing formations which are located substantially adjacent each other, and actuator means for causing the formations to move in a first direction thereby to pierce the shell of the egg and to move apart from each other to part the shell into two sections.

The cradle preferably includes one or more openings through which the contents of the egg can fall once the shell has been parted.

The device may include a pair of jaws which respectively carry the shell piercing formations.

The actuator means may take on any suitable form and preferably includes two handles which are connected to a pivot point, with the jaws being pivotally connected to the respective handles.

Guide means may be included to restrain the jaws so that the shell piercing formations are caused to move initially in the first direction as the handles are actuated and, after a predetermined amount of movement in the first direction, the formations are caused to move apart from each other.

The device may include first biasing means which acts between the handles with the handles being actuable against the force of the first biasing means.

Second biasing means may be included for acting directly or indirectly on the jaws with the jaw formations being movable apart, with the second biasing means opposing the corresponding jaw movement.

The shell piercing formations can be of any suitable form or shape and may comprise spikes, blades, teeth, or the like.

In a variation of the invention the device includes two arms which are mounted to respective pivot points, and the shell piercing formations are mounted to respective members which are slidable relatively to the arms in the first direction to a predetermined extent, the arms then being pivotally movable away from each other by the actuator means thereby to move the members and hence the shell piercing formations apart from each other.

Preferably the actuator means includes an actuator member which is mounted for sliding movement thereby to cause the said sliding movement of the said members, and the arms include formations which engage with the actuator member thereby to cause the said pivotal movement of the arms.

In a preferred embodiment the device includes a cradle which supports the egg, two arms which are mounted to respective pivot points, first and second members which are slidingly engaged with the arms, first and second shell piercing formations which are engaged respectively with the first and second members, and actuator means for causing sliding movement of the members, relatively to the arms, thereby to advance the shell piercing formations in a first direction and thereby pierce the shell of the egg, and then to cause pivotal movement of the arms, away from each other so that the shell piercing formations also move away from each other and thereby part the shell into two.

BRIEF DESCRIPTION OF THE DRAWINGS

The invention is further described by way of examples with reference to the accompanying drawings which.

DESCRIPTION OF PREFERRED EMBODIMENTS

Figure 1:
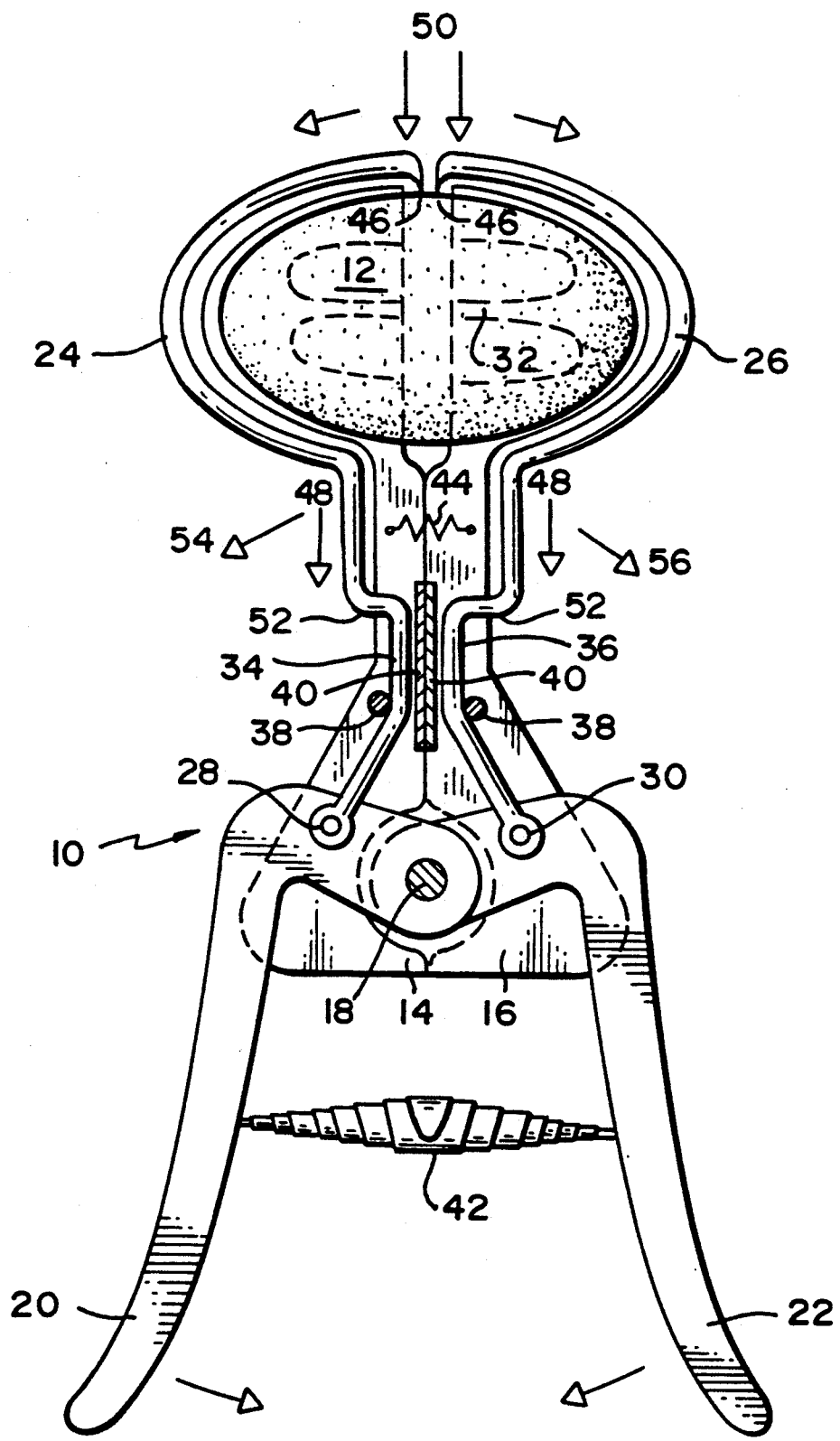
FIG. 1 depicts an egg cracking device according to one form of the invention.

FIG. 1 of the accompanying drawings illustrates a device 10 according to the invention for cracking egg 12.

The device 10 includes two body portions 14 and 16 respectively which are connected to one another at a main pivot point 18, first and second handles 20 and 22 which are pivotally mounted to the pivot point 18, and two jaws 24 and 26 which are pivotally attached to the respective handles 20 and 22 at pivot points 28 and 30.

The jaws 24 and 26, at their upper ends, are bent outwardly and include inwardly extending fingers 32 which define a cradle in which the egg 12 is placed. The fingers are also fixed to upper ends of the body portions 14 and 16.

The jaws 24 and 26 include inwardly bent sections 34 and 36 respectively which are substantially adjacent one another and which lie within respective pathways formed between a stop 38 and a guide plate 40 on each of the body portions 14 and 16.

A coil spring 42 is fixed between the handles 20 and 22. A second spring 44 acts between upper ends of the body portions 14 and 16.

With the handles 20 and 22 fully open the jaws 24 and 26 substantially contact one another at their free ends. These ends are formed with substantially flat and sharpened shell piercing formations 46.

In use of the device 10 an egg 12 which is to be cracked open is placed on the cradle formed by the fingers 32 which are mounted to the jaws and to upper ends of the body portions 14 and 16. When the handles 20 and 22 are closed the initial movement of the handles takes place against the biasing effect of the coil spring 42. The spring 44 has a substantially higher effective stiffness factor than the coil spring 42 and, for this reason, the body portions 14 and 16 are, during the initial movement of the handles kept in the illustrated position.

The bent sections 34 and 36 of the jaws are caused to move downwardly along the pathways between the stops 38 and the guide plates 40, as is indicated by means of an arrow 48. In this way the shell piercing formations 46 carried at the extremities of the jaws are moved towards the egg 12, in the direction of an arrow 50, and pierce the eggshell.

The extent to which the formations 46 move in the direction 50 is limited for, as the jaws are drawn in the direction 48, a stage is reached at which shoulders 52 on the jaws abut the respective stops 38. At this stage when the handles 20 and 22 are further closed it is not possible for the jaws to move in the direction 48 and consequently a pivotal action is exerted on the jaws which causes them to move apart. The jaws thus move outwardly in the direction of arrows 54 and 56 and cause the body portions 14 and 16 to move simultaneously therewith against the biasing effect of the spring 44.

The shell piercing formations 46 which are carried at the extremities of the jaws and which are all the time kept in the shell piercing position are thereby urged apart and the egg is cracked open.

As the jaws 24 and 26 are opened the fingers 32 carried by the respective jaws are also moved apart to a limited extent and, in this way, an opening is defined through the fingers through which the contents of the egg can fall. Thereafter the handles are released and the springs 42 and 44 cause the various components of the device to take up the positions shown in the drawing. The two halves of the eggshell are no longer engaged with the arms and can therefore be disposed of.

The device of the invention makes it possible rapidly and easily to crack eggs without damaging the yolks.

The invention is not limited to the precise form and arrangement of the components shown in the attached drawing and described hereinbefore and details thereof can be altered without departing from the inventive principles of the device. For example the shell piercing formations 46, which are in the nature of spikes, can be formed as blades or knife edges, or can be replaced by a number of teeth. If these formations are relatively wide then they are able to part the eggshell into two halves, more effectively, while lessening the likelihood of the eggshell breaking into small pieces. The essence of the device resides in the provision of the shell piercing formations which pierce the shell, moving to a limited extend only, and which then move apart causing the eggshell to be broken into two.

Figure 2:
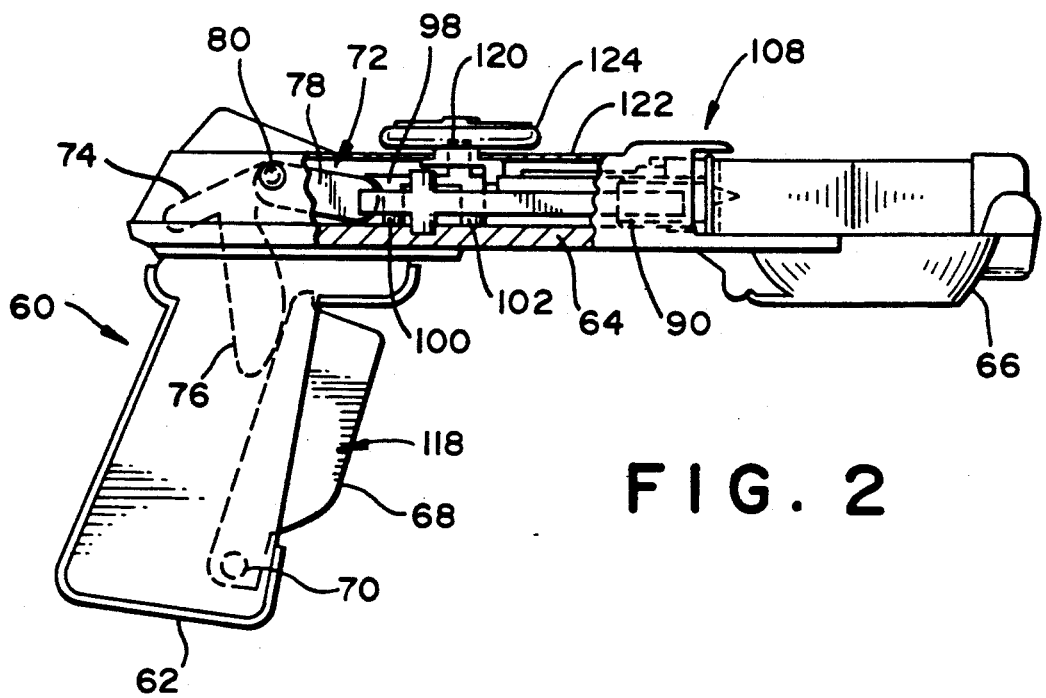
FIG. 2 is a side view of an egg cracking device according to a second form of the invention.
Figure 3:
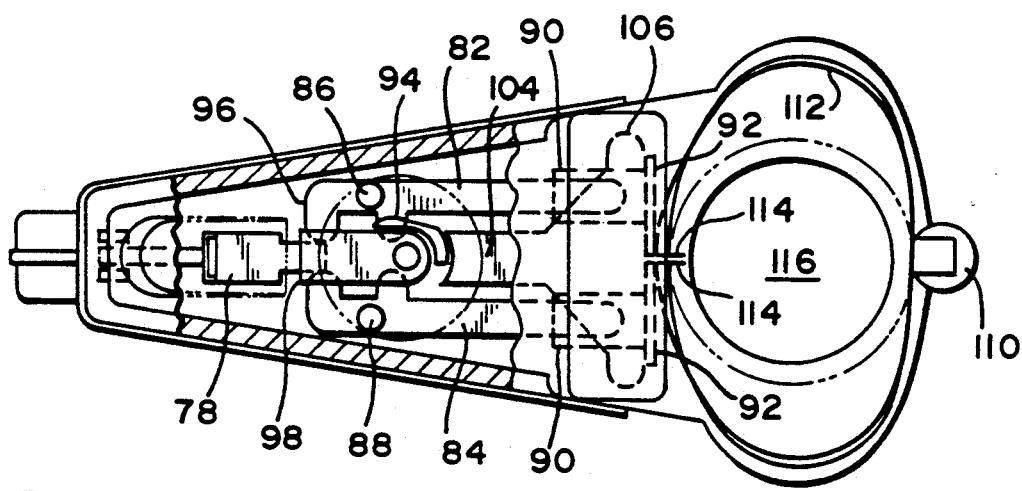
FIGS. 3 and 4 are plan views of the device of FIG. 2 in inoperative and operative positions respectively.
Figure 4:
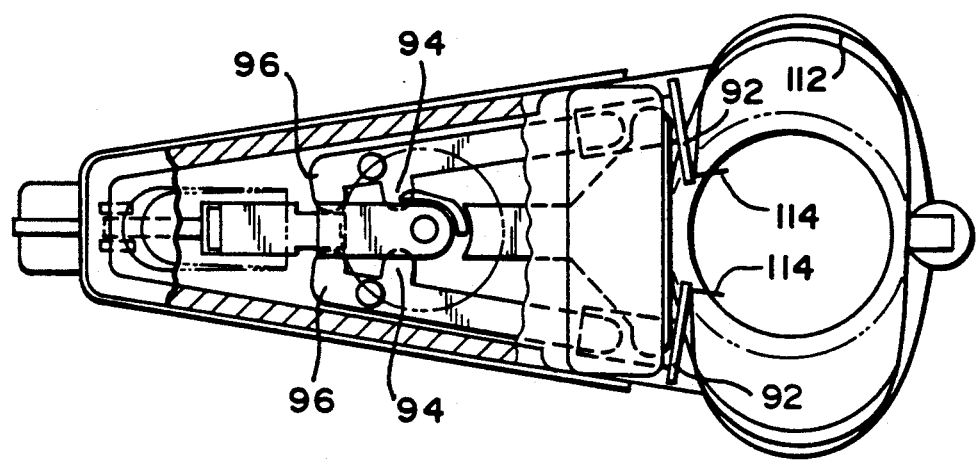

FIG. 2 of the accompanying drawings shows an egg cracking device 60 according to a second form of the invention from the side. FIGS. 3 and 4 show the device in plan in closed and open conditions respectively. The device includes a handle 62, a forwardly extending body portion 64 and a cradle 66.

Mounted inside the handle 62 is a trigger 68 which is fixed to a pivot point 70 and which extends through a slot on a forward side of the handle. Within the body portion 64 an articulated component 72 is located. This component includes a T-piece 74 the major limb of which marked 76 extends downwardly and abuts a rear surface of the trigger 68, and a link 78 which is pivotally connected to the T-piece at a point 80.

Two arms 82 and 84 respectively are pivotally fixed to the body portion at locations 86 and 88. Each arm at its forward end has a tubular member 90 slidingly located on it and each tubular member terminates in a flat front plate 92. The two plates 92 normally are close to one another or abut one another.

Each of the arms 82 and 84 has an inwardly extending lobe 94, more or less adjacent the respective pivot point, and to the rear of the lobe an inwardly extending projection 96.

An actuator 98 straddles the lobes 94. The actuator includes a rear extension 100 which is in contact with a leading end of the link 78 and a forward extension 102 which abuts a lower end of a central limb 104 of a T-piece 106. The T-piece is mounted for limited sliding movement in the direction of its limb 104. The crossbar of the T-piece designated 108 has a slot and the tubular members 90 are located therein.

The cradle 66 has an anchor point 110 at a forward end and a flexible band 112 is fixed at a central location to the anchor point. The band lies with an oval shape in a closed loop over the cradle and opposing ends of the band have prongs 114 fixed to it and extending forwardly. These opposing ends of the prongs are fixed to the respective plates 92 at the forward ends of the tubular members 90.

The cradle 66 is dished and includes a central aperture 116. Although not shown in the drawing the cradle could be designed in the manner of a utensil which is known per se and which is used to separate an egg white from an egg yolk.

In use of the device 60 an egg, not shown, is placed in the cradle 66 encircled by the band 112. If the trigger 68 is pulled it pivots in the direction of an arrow 118 against a cam surface of the limb 76. The pivot point 80 moves downwardly and the link 78 is advanced. The forward end of the actuator is urged by the link into engagement with the limb 104 of the T-piece 106 and the prongs 114 slide forwardly as the tubular members 90 move along the respective arms 82 and 84. The eggshell is thereby pierced by the prongs 114.

With further movement of the trigger the rear extension 100 of the actuator 98 is forced into abutment with the lobes 94 of the two arms and the arms are thereby pivoted outwardly. As the arms move outwardly the tubular members 90 also move outwardly and therefore the ends of the band, which are attached to the plates 92 and which carry the prongs 114, are also moved outwardly and the egg is thereby cracked in half. The contents of the eggshell i.e. the yolk and the white fall through the aperture 116.

The device can be adjusted within limits to accommodate eggs of different sizes. This is effected by providing an upwardly extending projection 120 on the actuator 98. A cover piece 122 of the body portion has a rotatable knob 124 which is engaged with the projection 120. As the knob is rotated a cam action acting on the projection causes the position of the actuator to be altered and it is either moved towards the cradle 66 or away from the cradle. In this way the position of the limb 104 is adjusted and ultimately the positions of the plates 92 are adjusted. Thus the area circumscribed by the band 112 is altered as well.

It is to be understood that in FIGS. 2, 3 and 4 certain springs and biasing devices have been omitted for the purposes of clarity of illustration. Thus the trigger 68 acts against a spring, not shown. Similarly the arms 82 and 84, when moved outwardly, move against a spring which thereafter, upon release of the trigger, restores the arms to the positions shown in FIG. 3.

A further point to be noted is that the actuator 98, when it moves forwardly, causes only a limited degree of movement of the shell piercing formations 114 towards the opposing side of the cradle. Once the rear extension 100 strikes the lobes 94 the rate of pivotal movement of the arms 82 and 84, relatively to the extent to which the formations 114 move towards the opposing side of the cradle, is very large. This ensures that the eggshell is parted and not crushed.

We claim:
1. An egg cracking device comprising:
  a body having a handle at a first end and an egg receiving cradle at a second end;
  first and second spaced, generally parallel arms pivotably supported on said body intermediate first and second ends of said first and second arms;
  a first actuator supported on said body between said first and second spaced arms, said first actuator being engageable with said arms and slidably operable to pivot said arms on said body;

first and second members supported for sliding movement on first ends of said first and second arms toward and away from said egg receiving cradle;

shell piercing formations attached to first and second plates positioned at first ends of said first and second members adjacent said egg receiving cradle;

a second actuator slidably supported on said body and having a first end engaging said first and second plates and a second end engaging said first actuator; and linkage means operable by said trigger to slide said first and second actuators along said body with respect to said first and second spaced arms whereby said shell piercing formations are moved into engagement with, and pierce, the shell of an egg placed on said cradle and are thereafter spread apart by pivotal movement of said first and second arms to part the shell of an egg into two sections.

2. A device according to claim 1 wherein the cradle includes one or more openings through which the contents of the egg can fall once the shell has been parted.

3. The egg cracking device of claim 1 further including a flexible band having a generally oval shape and forming a substantially closed loop over said egg receiving cradle, opposing ends of said flexible band being attached to said first and second plates.

* * * * *